United States Patent
Kutuzov et al.

(10) Patent No.: US 10,805,384 B1
(45) Date of Patent: Oct. 13, 2020

(54) SYSTEMS AND METHODS FOR LOAD BALANCING SERVER INFRASTRUCTURE

(71) Applicant: Parallels International GmbH, Schaffhausen (CH)

(72) Inventors: Alexey Kutuzov, Moscow (RU); Igor Marnat, Moscow (RU); Nikolay Dobrovolskiy, Moscow (RU); Serguei Beloussov, Costa del Sol (SG); Sergey Pachkov, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 28 days.

(21) Appl. No.: 16/129,877

(22) Filed: Sep. 13, 2018

(51) Int. Cl.
*H04L 29/08* (2006.01)
*H04L 29/06* (2006.01)

(52) U.S. Cl.
CPC ........ *H04L 67/101* (2013.01); *H04L 63/0281* (2013.01); *H04L 67/1008* (2013.01); *H04L 67/1063* (2013.01)

(58) Field of Classification Search
CPC .............. H04L 67/101; H04L 67/1008; H04L 67/1063; H04L 63/0281
USPC ........................................................ 709/226
See application file for complete search history.

(56) References Cited

U.S. PATENT DOCUMENTS

| | | | | |
|---|---|---|---|---|
| 6,085,222 A * | 7/2000 | Fujino | ................... | H04L 41/046 709/202 |
| 6,496,477 B1 * | 12/2002 | Perkins | ................... | H04L 45/00 370/228 |
| 2005/0091399 A1 * | 4/2005 | Candan | ............... | H04L 65/1043 709/238 |
| 2009/0228603 A1 * | 9/2009 | Ritzau | ..................... | H04L 12/66 709/238 |
| 2010/0064008 A1 * | 3/2010 | Yan | ......................... | H04L 45/64 709/204 |
| 2010/0077087 A1 * | 3/2010 | Roy | ..................... | H04L 29/1249 709/228 |
| 2013/0294289 A1 * | 11/2013 | Kneckt | ............. | H04W 72/0406 370/254 |
| 2014/0013001 A1 * | 1/2014 | Cox | .................... | H04L 67/1002 709/230 |
| 2014/0044007 A1 * | 2/2014 | Smadi | ................... | H04W 76/10 370/254 |
| 2014/0254595 A1 * | 9/2014 | Luo | ....................... | H04L 67/104 370/392 |
| 2016/0037328 A1 * | 2/2016 | Raveendran | ............ | H04W 8/08 370/328 |
| 2018/0255143 A1 * | 9/2018 | Quinlan | .................. | H04L 67/32 |
| 2019/0342161 A1 * | 11/2019 | Brandwine | ......... | H04L 12/4641 |

* cited by examiner

*Primary Examiner* — James E Springer
(74) *Attorney, Agent, or Firm* — Lowenstein Sandler LLP

(57) ABSTRACT

The present disclosure generally relates to the field of distributed system server administration, and more specifically, to systems and methods for load balancing server infrastructure and improving the performance of peer-to-peer connections between computing devices.

20 Claims, 5 Drawing Sheets

SYSTEMS AND METHODS FOR LOAD BALANCING SERVER INFRASTRUCTURE

FIELD OF TECHNOLOGY

The present disclosure relates generally to the field of distributed system server administration, and more specifically, to systems and methods for load balancing server infrastructure and improving the performance of peer-to-peer connections between computing devices.

BACKGROUND

Distributed systems have emerged as an increasingly popular platform for computing in recent years. These systems typically comprise one or more remote servers and other networked resources (e.g., cloud-based server farms) operating in conjunction to provide one or more services for end users. The complex architecture of modern distributed systems gives rise to multiple potential bottlenecks that may impact performance. For example, if a server is overloaded with applications being run simultaneously by a large number of connected computing devices, performance will decrease and administrators may need to limit access to server resources. Similarly, if the quality of the client-server network connection is low (e.g., due to low bandwidth), or the network connection is subject to a temporary surge in traffic, users might not be able to take full advantage of the computing facilities and resources provided by the server. The performance of a distributed system may consequently suffer due to poor load balancing, over-utilization of limited server resources, and network connectivity issues related to connections between one or more hardware components of the distributed system and connections between the distributed system and remotely located computing devices.

The decentralized arrangement of hardware resources in a distributed system also creates issues related to connectivity. For example, a user may wish to establish a peer-to-peer connection between two remote computing devices connected to a server of a distributed system. However, in many instances the individual computing devices will be located on different networks and may lack sufficient networking information to initiate a peer-to-peer connection.

In view of the above, there exists a need in the art for systems and methods that may be used to mitigate bottlenecks which would otherwise limit full utilization of distributed system resources, as well as for systems and methods which provide improved peer-to-peer connectivity between computing devices of a distributed system. The present application provides various systems and methods for establishing a connection between two or more computing devices which address these issues and provide other benefits which will become apparent in view of the accompanying drawings and from the detailed description that follows.

BRIEF SUMMARY

Systems and methods are described herein for establishing a connection between two or more computing devices. Throughout this disclosure, it is understood that the term "computing device" includes, without limitation: servers, as well as desktop/laptop computers and mobile/electronic devices which may be characterized as client devices of a given server.

The disclosed systems and methods provide, in some exemplary aspects, tools which allow an administration or end user of a distributed system to improve or optimize load balancing of server resources, and to more efficiently establish peer-to-peer connections between computing devices connected to the distributed system, using an intermediary proxy server.

According to a first exemplary aspect, such methods for establishing a connection between two or more computing devices comprise providing a server configured to store information identifying one or more proxy servers accessible to a first computing device and a second computing device; receiving, by the server, information from the first and second computing devices identifying one or more proxy servers accessible to each respective computing device; receiving, by the server, a request from the first computing device to initiate a connection to the second computing device; and transmitting information from the server to the first computing device in response to the request, identifying at least one proxy server accessible to both the first and second computing devices.

In some exemplary aspects, such methods may further comprise receiving, by the server, information about the quality of a connection established between the first and second computing devices using the at least one proxy server. Information about the quality of a connection established between the first and second computing devices using the at least one proxy server may include, without limitation, a) a network reliability and/or health parameter; b) a number of hops required for a connection from the first computing device to the second computing device using the proxy server; and/or c) a workload parameter of the proxy server, wherein the workload parameter comprises an amount or percentage of at least one hardware or network resource available to the proxy server, and/or a number of connections currently established to the proxy server.

In some exemplary aspects, such methods may further comprise analyzing, by the server, at least one parameter associated with the one or more proxy servers accessible to both the first and second computing devices; and prioritizing the one or more proxy servers accessible to both the first and second computing devices based upon the at least one parameter; wherein the information identifying at least one proxy server accessible to both the first and second computing devices transmitted to the first computing device is based on the results of the prioritizing step. In some aspects, the one or more proxy servers accessible to both the first and second computing devices are prioritized based upon a workload parameter of the one or more proxy servers, wherein the workload parameter comprises an amount or percentage of at least one hardware or network resource available to the proxy server and/or a number of connections currently established to the proxy server. Similarly, in other aspects, the one or more proxy servers accessible to both the first and second computing devices are prioritized based upon the geographic proximity of the one or more proxy servers to the first computing device and/or the second computing device.

In some exemplary aspects, the information from the first and second computing devices identifying one or more proxy servers accessible to each respective computing device is received by the server according to a schedule (e.g., daily, weekly, monthly) or in response to a predetermined triggering condition (e.g., each time an application or agent executed on a computing device is run). In all aspects of the disclosure described herein, it is understood that the server used to provide information regarding accessible proxy servers may be a cloud-based server.

In still further exemplary aspects, the first computing device may be configured to probe the one or more proxy servers accessible to the first computing device, by attempting to establish a connection to each of the accessible proxy servers and, if successful, dropping the connection after a pre-set amount of time. The probing may be performed by an application or agent executed on the first computing device, and the application or agent may be configured to store information identifying a most recent successful connection to one or more of the accessible proxy servers in a cache.

According to another exemplary aspect, a system for establishing a connection between two or more computing devices is provided, comprising at least two computing devices, and a server configured to provide information to at least one of the computing devices identifying at least one proxy server accessible to both the first and second computing devices.

According to another exemplary aspect, a system is provided comprising a server, at least one computing device and a processor configured to perform any of the methods disclosed herein.

According to another exemplary aspect, a computer-readable medium is provided comprising instructions that comprise computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for establishing a connection between two or more computing devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
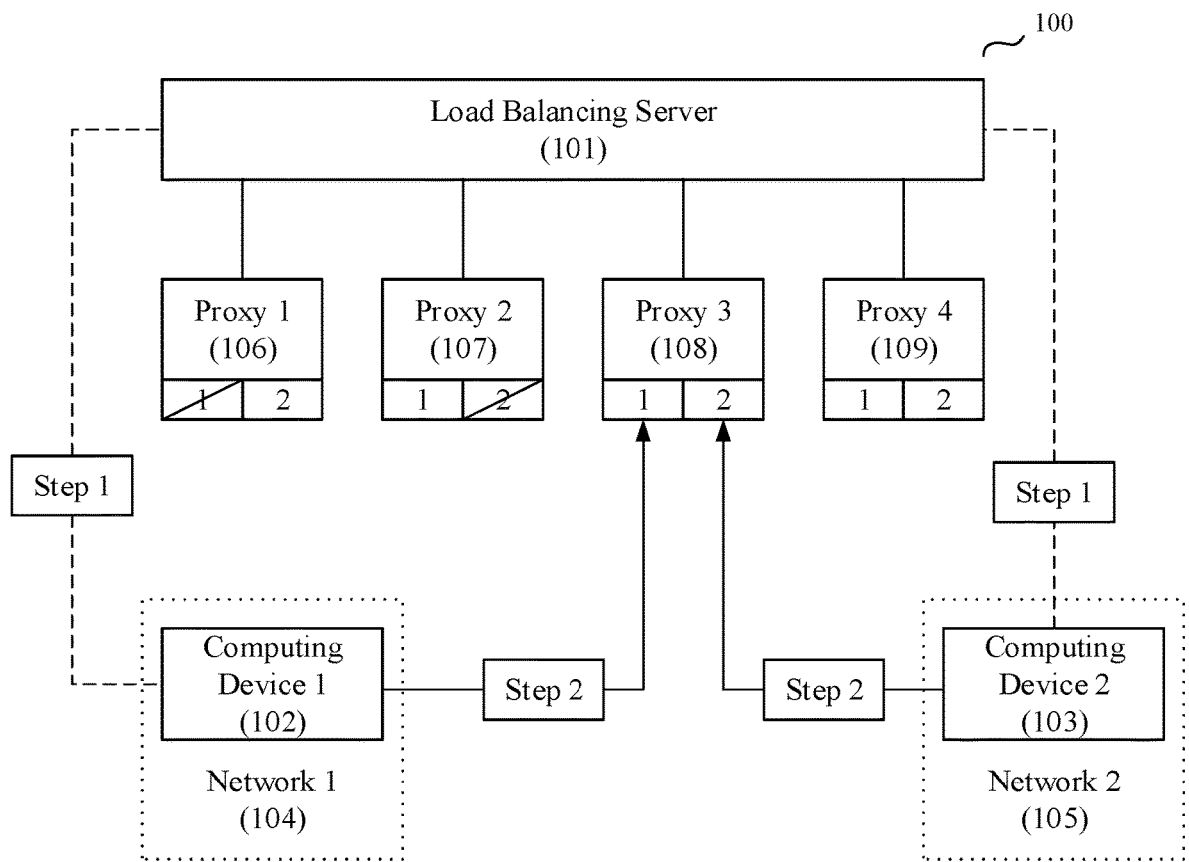
FIG. 1 is a block diagram of a system for establishing a connection between two or more computing devices according to an exemplary aspect of the disclosure.

FIG. 1 is a block diagram of a system 100 for establishing a connection between two or more computing devices according to an exemplary aspect. As illustrated by this figure, in some exemplary aspects, the system 100 may be a distributed system that includes a Load Balancing Server ("LBS," 101) which has access to one or more proxy servers. In this example, four proxy servers are illustrated (106-109). The system 100 may further comprise a plurality of computing devices configured to connect to the LBS (101). In this example, two computing devices are illustrated (102, 103). These first and second computing devices (102,103) may be configured to provide information to the LBS (101) identifying one or more accessible proxy servers (106-109). This information may be provided to the LBS (101) according to a schedule (e.g., daily, weekly, or monthly), in response to a triggering condition (e.g., each time a particular application or agent is executed on the first or second computing device (102, 103)), or manually in response to user input (e.g., by selecting an option to send this information using an interface of an application executed on the first or second computing device (102, 103)). In this context, accessible proxy servers (106-109) comprise proxy servers (106-109) that the respective computing device is capable of using as an intermediary for requests seeking resources from other servers. A user of the first computing device (102) may wish to initiate a direct peer-to-peer connection with the second computing device (103) (e.g., to transfer files from the former to the latter). However, network information may be unavailable for the second computing device (103). As illustrated by this figure, the first computing device (102) may attempt to resolve this issue by sending a request to the LBS (101) for information identifying proxy servers (106-109) which are reportedly accessible to both the first and second computing devices (102, 103). In this example, the response indicated that the first computing device (102) and the second computing device (103) are both able to access Proxy Server 3 (108) and Proxy Server 4 (109). Proxy Server 1 (106) is only accessible to the second computing device (103), whereas Proxy Server 2 (107) is only accessible to the first computing device (102). Accordingly, the first computing device (102) may establish a connection to the second computing device (103) using Proxy Server 3 (108) or Proxy Server 4 (109). In this particular example, Proxy Servers 3 (108) is selected for the connection.

In some exemplary aspects, the system 100 may comprise a remote application server ("RAS"). The RAS may comprise a collection of components (e.g., a server farm) maintained as a logical entity. For example, a RAS may include: at least one gateway, at least one publishing agent, at least one remote desktop services (RDS) server and at least one virtual desktop infrastructure (VDI) server communicatively connected to the RAS via a network connection. A user of a first computing device (102) connected to the RAS may wish to initiate a peer-to-peer connection to a remote host of the RAS (e.g., a gateway or VDI server). A connection may be established in accordance with the method of the previous example (i.e., by selecting a mutually accessible proxy server). However, in some instances, a more complex methodology may be preferable. For example, the LBS (101)

may be configured to analyze at least one parameter associated with the one or more proxy servers accessible to both the first (102) and second (103) computing devices; and prioritize the one or more proxy servers accessible to both the first (102) and second (103) computing devices based upon the at least one parameter. The results of this prioritization step may then be provided to the first computing device (102) (e.g., in the transmitted information sent from the LBS (101) to the first computing device (102) in response to the request). In some exemplary aspects, all shared proxy servers are assigned a priority rank in order from highest to lowest priority. In others, shared proxy servers may be assigned to priority rank classes (e.g., with multiple proxy servers added to a given class). In some aspects the results of the prioritization step may be transmitted from the LBS (101) to one or more of the computing devices (e.g., the first computing device, 102) as a list or database.

The at least one parameter used to prioritize the one or more proxy servers accessible to both the first (102) and second (103) computing devices may comprise any parameter useful to describe the performance and/or status of any hardware or networking component of a distributed system. For example, in some aspects the at least one parameter may comprise one or more of the following: a) a network reliability and/or health parameter; b) a number of hops required for a connection from the first computing device to the second computing device using the proxy server; and/or c) a workload parameter of the proxy server, wherein the workload parameter identifies an amount or percentage of at least one hardware or network resource available to the proxy server, and/or a number of connections currently established to the proxy server. In some exemplary aspects, this analysis, and any other step or aspect of the process for identifying shared proxy servers, may be performed by a module of an application or agent executed on one of the computing devices (e.g., the first computing device, 102) or on the LBS (101).

In some exemplary aspects, the application or agent may be configured to, measure, analyse or otherwise determine one or more of the parameters or metrics described herein. For example, the application or agent may analyse network reliability and/or health parameters related to individual network connections between a single computing device (102, 103) and a given proxy (106) or an end-to-end network connection between a first computing device (102) and a given proxy (106) and a second computing device (103). Parameters may be determined on a per-session basis, as an aggregate, or as a combination thereof. For example, the application or agent may determine network reliability and/or health parameters for active sessions between a first computing device 102 and one or more proxies 106. In other aspects, parameters may be determined for active sessions of an end-to-end network connection between a first computing device (102) to a second computing device (103) mediated by a proxy (106). Either of the first or second computing devices (102, 103) may be, for example, an RDS or VDI server of a distributed system.

In some exemplary aspects, the application or agent may be configured to determine (and/or receive information describing) one or more hardware or software parameters of a computing device (102, 103) or of a proxy (106) described herein. In some aspects, such parameters may comprise parameters which may impact or limit the quality of an end-to-end network connection between a first computing device (102) and a given proxy (106) and a second computing device (103), or a connection between any of these individual components. Exemplary hardware parameters include, without limitation: central processing unit (CPU) queue length, random access memory (RAM) page faults, hard disk, disk queue length, and input/output operations per second (IOPS) metrics. Exemplary IOPS metrics include, without limitation, PhysicalDisk/%idle time (should not be less than ~60%), PhysicalDisk/Avg. Disk sec/Read (should not be higher than ~20 ms) PhysicalDisk/Avg. Disk sec/Write should not be higher than ~20 ms, PhysicalDisk/Current disk queue length (should not be higher than 2), Memory\Available Mbytes, minimum 10% of memory (should be free and available), Memory\Pages/sec (should not be higher than 1000), Network Interface(*)\Bytes Total/sec (Less than 40% of the interface consumed=Healthy; 41%-64% of the interface consumed=Monitor or Caution; 65-100% of the interface consumed=Critical, performance will be adversely affected), Network Interface(*)\Output Queue Length (0=Healthy; 1-2=Monitor or Caution; Greater than 2=Critical, performance will be adversely affected), Paging File\%Usage (should not be higher than 10%). For example, either of the first or second computing devices (102, 103) may require a minimum amount of RAM to display a high resolution remote session, with performance progressively degrading as the amount of available RAM is lowered.

In still further exemplary aspects, the application or agent may be configured to determine (and/or receive information describing) one or more workload parameters of a proxy server (106), including without limitation: a CPU load and/or free RAM metric, a disk length queue metric, an uptime metric, or any other benchmark known in the art to be an indicator of the performance status or level of a proxy server (106). In some exemplary aspects, the workload parameter may include information describing one or more hard disk, memory and/or processor bottleneck(s) caused by hardware or networking component(s) of the proxy server (106). In some exemplary aspects, the workload parameter may comprise an amount or percentage of at least one hardware or network resource available to the proxy server, and/or a number of connections currently established to the proxy server.

The application or agent may be configured to apply one or more artificial intelligence algorithms and/or machine learning (e.g., multiple parameters may be analyzed using a neural network trained to select a proxy server expected to produce the best performance among the set of all shared proxy servers accessible to the computing devices for which a connection is requested). For example, in some exemplary aspects the application or agent may implement one or more algorithms which identify an optimum path (e.g., an optimum end-to-end connection from a first computing device (102) to a second computing device (103) through an intervening proxy selected from a plurality of available proxies (106-109)). Such techniques may implement a machine learning approach, such as reinforcement learning techniques.

In a reinforcement learning framework, an agent interacts with an environment to learn what actions it needs to take in any given environment state to maximize a long-term reward. In the typical model of reinforcement learning, the agent begins only with knowledge of which actions are possible and no a priori knowledge about anything else about the world, and it is expected to learn a skill or solve a problem solely by interacting with the environment and receiving rewards after every action it takes. In recent years, reinforcement learning techniques have been paired with neural networks in order to solve more complex problems.

It is understood that reinforcement learning and/or neural network based algorithms may be used by the application or agent when evaluating the parameters and metrics described herein, alone or in combination, as part of a method or system to determine optimal or otherwise preferable network connections. For example, the application or agent may implement a reinforcement learning based model that takes into account one or more network reliability and/or health parameters, alone or in combination with other metrics described herein.

In some exemplary aspects, the network reliability and/or health parameter may comprise a metric based on an end-to-end network connection (e.g., a connection from the first computing device to a given proxy to a second computing device). For example, the network reliability and/or health parameter may comprise a metric based on the number of times that a given end-to-end connection has been reported or otherwise determined to be successful over a given span of time (e.g., during the previous hour, day or other span of time), or during a recent amount of time (e.g., during the past 5 minutes, 30 minutes, 60 minutes, etc.). In other aspects, the network reliability and/or health parameter may comprise a metric based on other network parameters related to the end-to-end network connection, including but not limited to: the number of hops, bandwidth (current/maximum/minimum/average), latency, or packet drops.

Network reliability and/or health parameters may be reported to the LBS (101) by any of the computing devices (102, 103), by the proxies (106-109) or any other networking infrastructure components which implement and/or monitor end-to-end connections mediated by the LBS (101). For example, either of the computing devices (102, 103) may report whether a connection is successful or unsuccessful to the LBS (101) immediately after a connection is attempted using a given proxy, after a delay, or upon receipt of a status or update request from the LBS (101). Such reports may comprise information describing one or more network reliability and/or health parameters. In some exemplary aspects, computing devices (102, 103) may be configured to transmit reports periodically, after a given amount has time has elapsed, after a given number of connection attempts, or according to any other schedule.

In some exemplary aspects, the system 100 may be configured to prioritize the selection of a proxy server which promotes the efficient use of distributed system resources (e.g., load balancing). For example, the analysis and/or prioritization steps may take into account one or more workload parameters which identify an amount or percentage of at least one hardware or network resource available to the proxy server, and/or a number of connections currently established to the proxy server. In some aspects, the analysis and/or prioritization steps may take into account threshold levels for the one or more workload parameters (e.g., a proxy server which has a current number of connections above a given threshold may be automatically identified as a low priority during the analysis process). Similar upper and/or lower thresholds may be applied to any other parameter described herein during the analysis and/or prioritization steps.

The LBS (101) may also prioritize proxy servers based upon current or expected network conditions associated with the proxy servers or connections between the proxy servers and other components of the distributed system. In some aspects, the LBS (101) may be configured to prioritize proxy servers based upon one or more workload parameters if at least two proxy servers have been assigned the same rank following an analysis of one or more other parameters. The results of the prioritization and/or the analysis steps may be presented to the user of the computing device for manual selection. Alternatively, in some exemplary aspects the computing device may be configured to automatically attempt to establish a connection to a proxy server following the prioritization step.

In some exemplary aspects, the LBS (101) may receive information about the quality of a connection established between the first (102) and second (103) computing devices using the at least one proxy server, following the establishment of a connection (e.g., network reliability and/or health parameters associated with an end-to-end connection). In some exemplary aspects, the first (102) and/or second (103) computing devices may be configured to report this connection quality information automatically upon the successful establishment of a connection. In other aspects, this quality information may be transmitted to the LBS (101) upon request or according to a schedule. In any event, this quality information is useful, in view of the fact that it comprises historical data that may be optionally used in subsequent analysis and/or prioritization steps. As noted above either or both of these steps may be performed using artificial intelligence (e.g., machine learning) algorithms. This historical data may be thus be used to train or validate models used by the application or agent which performs these steps.

In some exemplary aspects, the first computing device (102) may be configured to periodically communicate with the LBS (101) according to a schedule or triggering condition, in order to obtain information about proxy servers accessible to the first computing device (102) and/or other computing devices connected to the LBS (101). The obtained information may comprise current or historical information about the performance or status of connections established between the first computing device (102) and one or more of the proxy servers accessible to the first computing device (102). This performance and status-related information may comprise, e.g., information based on any of the hardware or network parameters described herein. The obtained information may also comprise, in some aspects, information about the hardware and/or network parameters of one or more of the proxy servers accessible to the first computing device (102) and/or one or more other computing devices which have been or are currently connected to the LBS (101). For example, the obtained information may comprise an IP address and one or more hardware parameters (e.g., an amount of memory and processor speed) and workload parameters (e.g., a number of currently active connections) for a given proxy server. As a further example, the obtained information may comprise historical information comprising hourly workload parameters for a proxy server reported during the immediately preceding 24-hour period (e.g., which provides guidance regarding expected workload parameters that may be observed during the current day). The obtained information may also comprise topological data describing one or more current or previous network connections.

In some exemplary aspects, the first computing device (102) may be configured to probe one or more resources of the distributed system (e.g., accessible proxy servers) based upon information obtained from the LBS (101). Probing refers to the establishment of a connection to a distributed system resource, which is then disconnected after a brief period of time. For example, after obtaining historical information about the performance of connections established between the first computing device (102) and several proxy servers that were previously accessible, the first computing device (102) may proceed to probe each of the proxy servers in order to determine whether these resources remain accessible. Probing may be performed by an application or agent executed on the first computing device (102).

In some exemplary aspects, the application or agent may be configured to store probe results in a cache (e.g., the most recent batch of probes results or the most recent successful probe results may be cached). In some exemplary aspects, a probing step may be performed prior to or in combination with the analyzing and prioritizing steps of methods described herein in order to select a proxy server which may be used to connect to a second computing device (103). The results of a probe (or a plurality of probes) may be used as inputs for proxy server selection methods based on artificial intelligence or machine learning algorithms, alone or in combination with any other parameters described herein.

Figure 2:
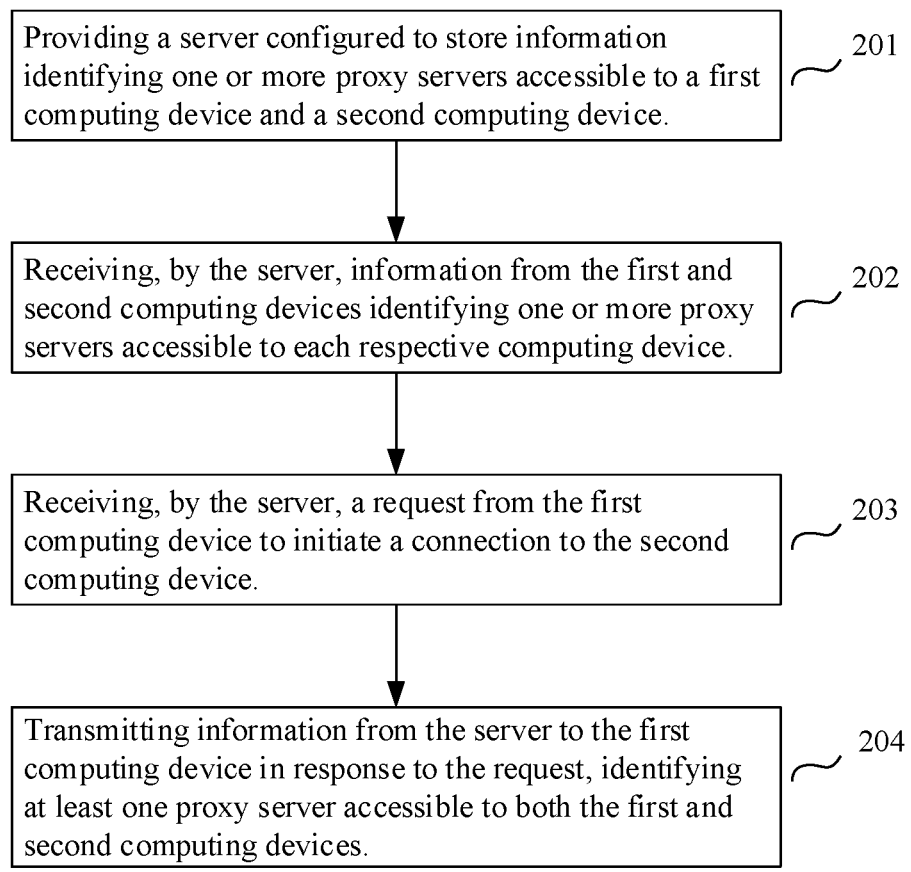
FIG. 2 is a flowchart of a method for establishing a connection between two or more computing devices according to an exemplary aspect.

FIG. 2 depicts an exemplary method for establishing a connection between two or more computing devices according to an exemplary aspect of the disclosure. In this example, at step 201 a server configured to store information identifying one or more proxy servers accessible to a first computing device and a second computing device is provided. This server may be an LBS (101) as described herein. The server may be a hardware or virtual server, and in some aspects may be a cloud-based server. In any event, at step 202 the server may receive information from the first and second computing devices (102, 103) identifying one or more proxy servers accessible to each respective computing device. Next, at step 203, the server may receive a request from the first computing device (102) to initiate a connection to the second computing device (103). As discussed above in the context of FIG. 1, the server may respond to this request by transmitting information from the server to the first computing device (102) in response to the request, identifying at least one proxy server accessible to both the first and second computing devices (102, 103).

Figure 3:
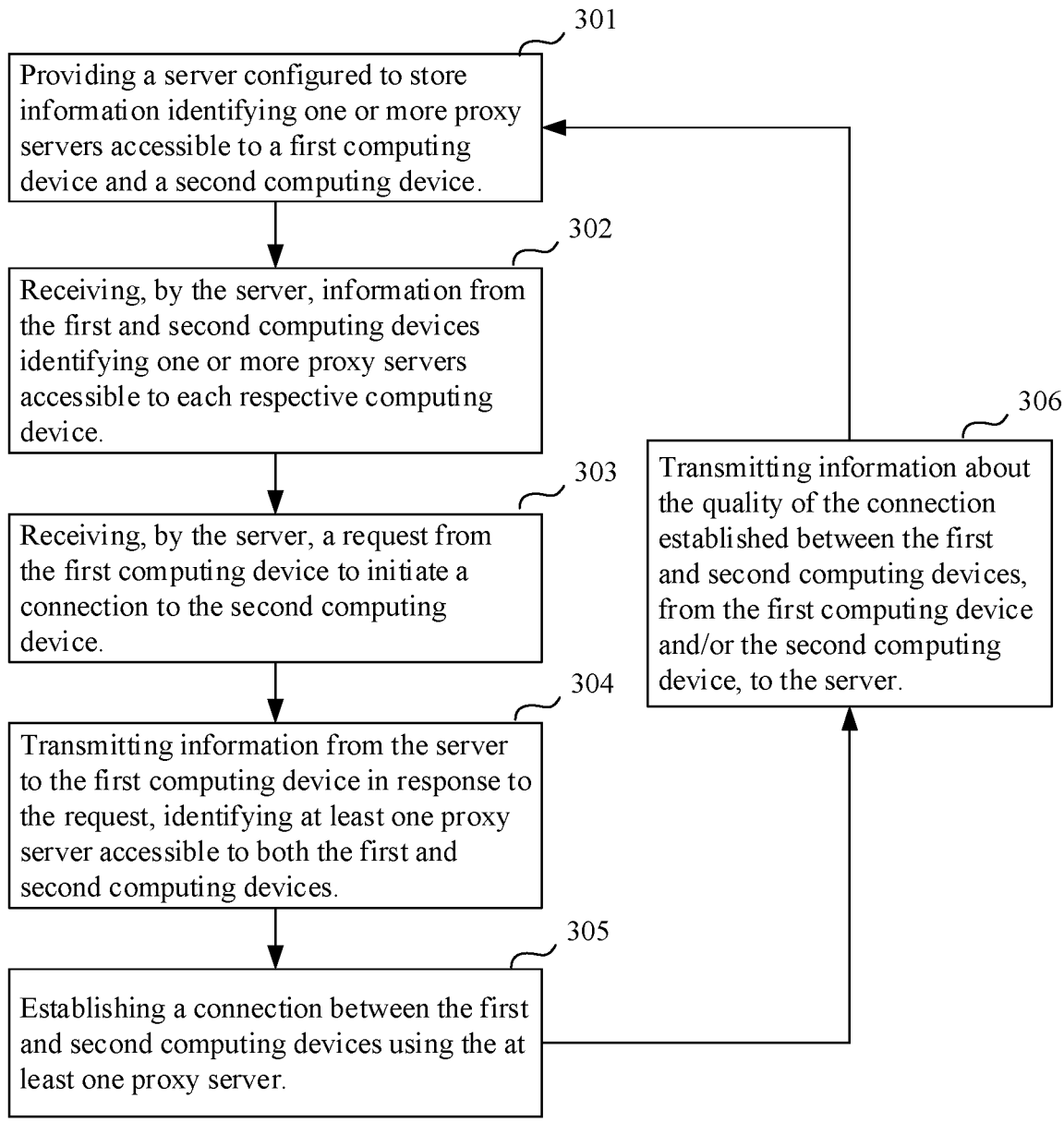
FIG. 3 is a flowchart of a method for establishing a connection between two or more computing devices according to another exemplary aspect.

FIG. 3 depicts an exemplary method for establishing a connection between two or more computing devices according to an another exemplary aspect. As illustrated by this flowchart, the initial four steps of the method of FIG. 2 may result in the establishment of a connection between the first and second computing devices (102, 103) using the at least one proxy server (step 305). Thereafter, information about the quality of the connection established between the first and second computing devices (102, 103), from the first computing device (102) and/or the second computing device (103), to the server (e.g., the LBS, 101). As shown by this figure, connection quality information obtained from previously established connections may be stored on the server (e.g., the LBS, 101) as of step 301, and so may be available for use when carrying out analysis and/or prioritization steps associated with subsequent connection requests.

Figure 4:
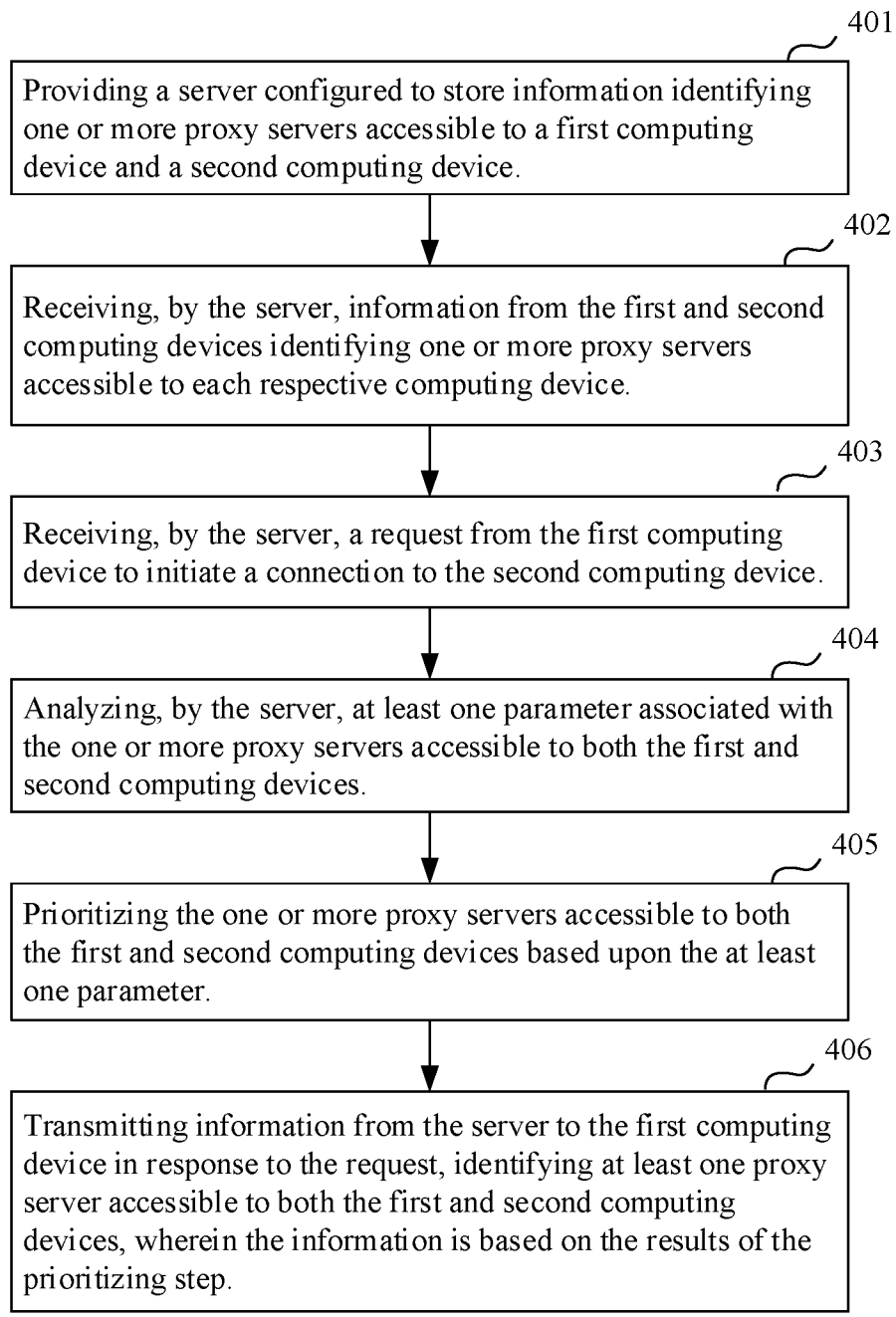
FIG. 4 is a flowchart of a method for establishing a connection between two or more computing devices according to another exemplary aspect.

FIG. 4 depicts an exemplary method for establishing a connection between two or more computing devices according to an another exemplary aspect. At step 401, a server (e.g., an LBS 101) configured to store information identifying one or more proxy servers accessible to a first computing device and a second computing device (102, 103) is provided. At step 402, the server may receive information from the first and second computing devices (102, 103) identifying one or more proxy servers accessible to each respective computing device. Thereafter at step 403, the server may receive a request from the first computing device (102) to initiate a connection to the second computing device (103). At this point, the method of this exemplary aspect diverges from that of the method shown in FIG. 2 in that it proceeds to the analysis and/or prioritization steps. Accordingly, at step 404, the server may analyze at least one parameter associated with the one or more proxy servers accessible to both the first and second computing devices (102, 103). Following this analysis, the server may then prioritize the one or more proxy servers accessible to both the first and second computing devices (102, 103) based upon the at least one parameter. Finally, the server may then proceed to transmit information to the first computing device in response to the request, identifying at least one proxy server accessible to both the first and second computing devices (102, 103), wherein the information is based on the results of the prioritizing step.

In some exemplary aspects, the prioritizing step may include an analysis of any of the parameters and/or metrics described herein, individually or in combination. This analysis may optionally include the use of artificial intelligence and/or machine learning techniques. For example, the server may comprise an LBS (101) running an application or agent configured to analyze network reliability and/or health parameters associated with an end-to-end connection between a first computing device (102) and a second computing device (103) using one or more proxy servers (106) which accessible to both computing devices (102, 103), in order to determine and prioritize potential end-to-end network connections. This analysis and prioritization process may optionally include one or more additional parameters, such as hardware or software parameters associated with the computing devices (102, 103) and/or server workload parameters associated with the proxy server (106). It is understood that prioritization may be based on the analysis of any combination of parameters described herein.

In some exemplary aspects, the analysis and prioritization process may include the use of one or more threshold levels for any of the parameters described. For example, prioritization may take into account a minimum bandwidth requirement for an end-to-end network connection between the first computing device (102) and a second computing device (103), mediated by a proxy (106). Thresholds for any of the parameters described herein may be used (e.g., minimum, maximum or average thresholds). In some exemplary aspects, a user may be prompted to select one or more parameters (and optionally preferences or thresholds) to be used during the analysis and prioritization steps. For example, a user may be presented with a graphical user interface allowing the user to select one or more parameters, and optionally preferences or thresholds. Information regarding user-selected parameters may be transmitted to the server along with the request from the first computing device (102) to initiation a connection with the second computing device (103). In other aspects, a server may be configured to store pre-selected user preferences and/or thresholds for one or more parameters (e.g., user profiles associated with such information).

In some exemplary aspects, the analysis and prioritization process may use current parameters (e.g., recently determined or real-time parameters). In other aspects, historical parameters may be used, alone or in combination with current parameters. For example, previously-reported connection quality data may indicate that a given proxy server (106) typically has a high resource utilization level at a given time of day (or over a span of time, on specific days, etc.) This historical parameter may be taken into account during the prioritization process, e.g., connection requests received at the same time on a later date may be directed to an alternative proxy server (106). It is understood that historical data for any of the parameters described herein may be similarly used to prioritize connections (e.g., the status/level of a historical parameter may be predictive of the current or future status/level). In some exemplary aspects, the prioritization process may also incorporate information from multiple computing devices. For example, a plurality of computing devices may report to the server network reliability and/or health parameters associated with an end-to-end connections using a given proxy server (106). This information may aggregated in order to determine relative quality scores for a given connection using this proxy server (106) versus other available proxy servers (106). In some exemplary aspects, prioritization may take into account a geographic location of the computing devices (102, 103) and/or the proxy server (106) (e.g., to prioritize a connection that results in the shortest geographic difference. Geographic information may also be used to prioritize a connection that is routed through a given country or set of countries selected by a user.

As described herein, an application or agent executed on the first computing device (102) may be configured to receive information transmitted from the server identifying one or more proxy servers (106) accessible to the first and second computing devices. This application or agent may be configured to automatically initiate a connection to the proxy server (106) and to transit information to the proxy server (106) allowing the latter to establish a connection with the second computing device (103) (e.g., establish an end-to-end network connection). In other aspects, the application or agent may present a set of one or more potential end-to-end network connections to the user, allowing the user to select a route. This set may be displayed with textual or graphical elements ranking (e.g., showing the prioritization of) one or more of the potential end-to-end network connections.

Figure 5:
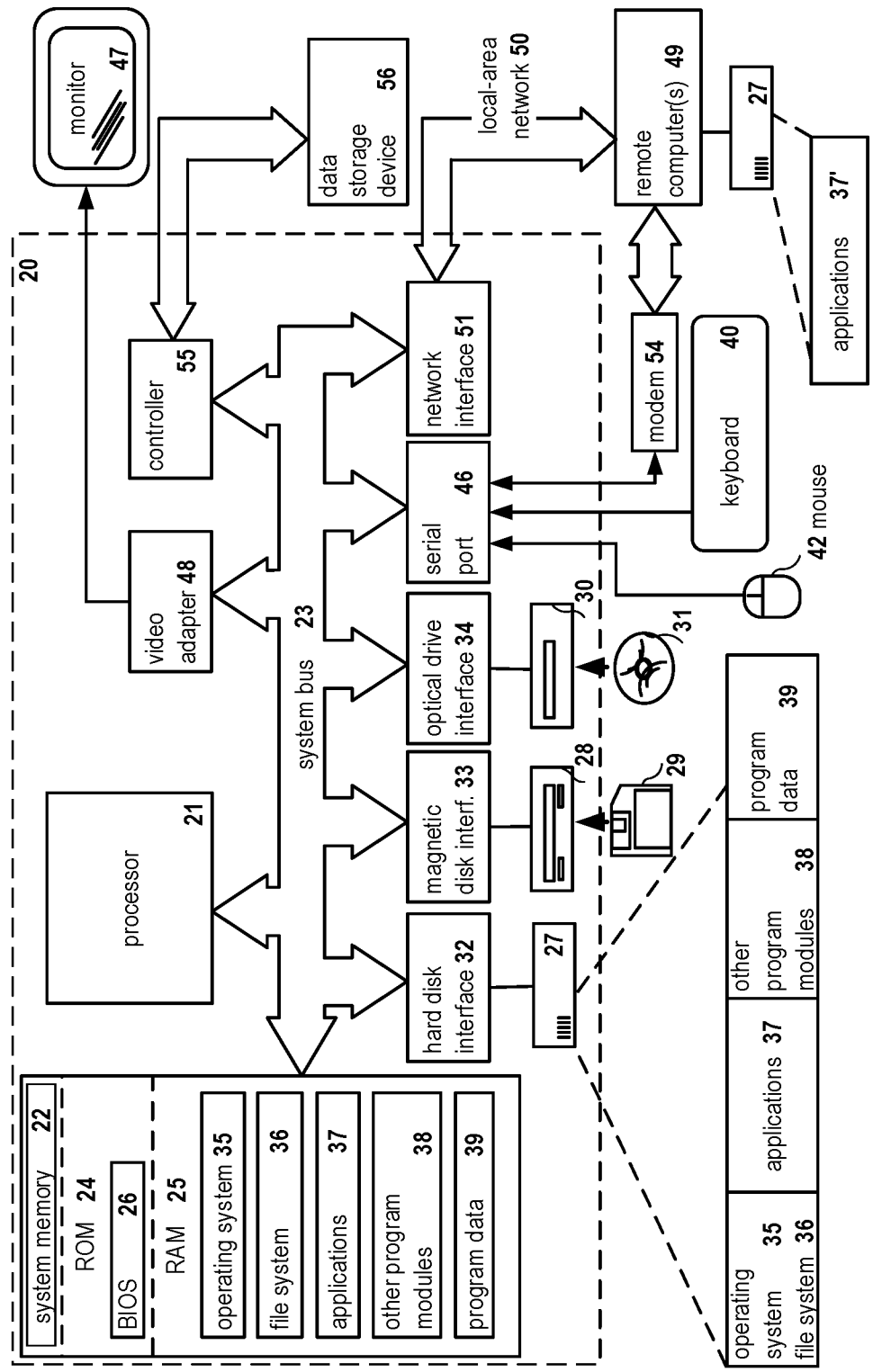
FIG. 5 is a block diagram of a computer system on which the disclosed systems and methods can be implemented according to an exemplary aspect.

FIG. 5 illustrates an example of a general-purpose computer system on which the disclosed systems and methods can be implemented according to an exemplary aspect. It should be noted that computer system 20 can correspond to a server (e.g., LBS 101) or a computing device (102, 103), for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method, comprising:
   receiving, by a server, from a first computing device, a first information comprising one or more identities of one or more proxy servers accessible by the first computing device;
   receiving, from a second computing device, a second information comprising one or more identities of one or more proxy servers accessible by the second computing device;
   receiving, by the server, a request from the first computing device to initiate a connection to the second computing device;
   identifying, based on the first information, the second information, and a plurality of values of a workload metric for each proxy server of the one or more proxy servers accessible by the first computing device and the second computing device, a proxy server accessible to the first computing device and the second computing device; and
   transmitting, to the first computing device, an identifier of the proxy server accessible to the first computing device and the second computing device.

2. The method of claim 1, wherein the first information further comprises values of a network performance metric on respective network paths between the first computing device and each of the one or more proxy servers accessible by the first computing device.

3. The method of claim 2, wherein the network performance metric reflects numbers of hops on respective network paths between the first computing device and each of the one or more proxy servers accessible by the first computing device.

4. The method of claim 2, wherein the network performance metric reflects latencies of respective network paths between the first computing device and each of the one or more proxy servers accessible by the first computing device.

5. The method of claim 2, wherein the network performance metric reflects available bandwidths of respective network paths between the first computing device and each of the one or more proxy servers accessible by the first computing device.

6. The method of claim 2, wherein the network performance metric reflects number of dropped packets on respective network paths between the first computing device and each of the one or more proxy servers accessible by the first computing device.

7. The method of claim 2, wherein the proxy server accessible to the first computing device and the second computing device is selected based on the values of the network performance metric.

8. The method of claim 1, wherein the server is a cloud-based server.

9. The method of claim 1, wherein the first information is received by the server according to a schedule.

10. The method of claim 1, wherein the first information further comprises values of a network performance metric on respective end-to-end paths connecting the first computing device and the second computing device via each proxy server of the one or more proxy servers accessible by the first computing device and the second computing device.

11. The method of claim 1, wherein the first information further comprises values reflecting geographic proximity of each proxy server of the one or more proxy servers to the first computing device and the second computing device.

12. A server computer system, comprising:

a memory; and a processor, coupled to the memory, the processor configured to:

receive, from a first computing device, a first information comprising one or more identities of one or more proxy servers accessible to each respective by the first computing device;

receive, from a second computing device, a second information comprising one or more identities of one or more proxy servers accessible by the second computing device;

receive a request from the first computing device to initiate a connection to the second computing device;

identify, based on the first information, the second information, and a plurality of values of a workload metric for each proxy server of the one or more proxy servers accessible by the first computing device and the second computing device, a proxy server accessible to the first computing device and the second computing device; and transmit, to the first computing device, an identifier of the proxy server accessible to the first computing device and the second computing device.

13. The system of claim 12, wherein the first information further comprises values of a network performance metric on respective network paths between the first computing device and each of the one or more proxy servers accessible by the first computing device.

14. The system of claim 13, wherein the network performance metric reflects numbers of hops on respective network paths between the first computing device and each of the one or more proxy servers accessible by the first computing device.

15. The system of claim 13, wherein the network performance metric reflects latencies of respective network paths between the first computing device and each of the one or more proxy servers accessible by the first computing device.

16. The system of claim 13, wherein the network performance metric reflects available bandwidths of respective network paths between the first computing device and each of the one or more proxy servers accessible by the first computing device.

17. The system of claim 13, wherein the network performance metric reflects number of dropped packets on respective network paths between the first computing device and each of the one or more proxy servers accessible by the first computing device.

18. The system of claim 13, wherein the proxy server accessible to the first computing device and the second computing device is selected based on the values of the network performance metric.

19. The system of claim 12, wherein the first information is received by the server computer system according to a schedule.

20. The system of claim 12, wherein the first information further comprises values of a network performance metric on respective end-to-end paths connecting the first computing device and the second computing device via each proxy server of the one or more proxy servers accessible by the first computing device and the second computing device.

* * * * *